(12) United States Patent
Zhu

(10) Patent No.: US 7,545,825 B2
(45) Date of Patent: Jun. 9, 2009

(54) METHOD FOR MANAGING MULTICAST SUBSCRIBERS IN MOBILE NETWORK

(75) Inventor: Fenqin Zhu, Shenzhen (CN)

(73) Assignee: Hauwei Technologies Co., Ltd., Shenzhen (CN)

( * ) Notice: Subject to any disclaimer, the term of this patent is extended or adjusted under 35 U.S.C. 154(b) by 883 days.

(21) Appl. No.: 10/359,383

(22) Filed: Feb. 5, 2003

(65) Prior Publication Data

US 2003/0152098 A1    Aug. 14, 2003

(30) Foreign Application Priority Data

Feb. 9, 2002    (CN) ............... 02 1 03932

(51) Int. Cl.
*H04J 3/26* (2006.01)
*H04H 20/71* (2006.01)
*H04L 12/56* (2006.01)

(52) U.S. Cl. ............... 370/432; 370/312; 370/390

(58) Field of Classification Search ......... 370/395.3, 370/395.31, 486, 432, 312, 390; 455/456.1, 455/3.04

See application file for complete search history.

(56) References Cited

U.S. PATENT DOCUMENTS

| | | | |
|---|---|---|---|
| 3,882,421 A | 5/1975 | Stein | |
| 5,570,366 A | 10/1996 | Baker et al. | 370/85.13 |
| 5,570,422 A | 10/1996 | Napiorkowski | |
| 5,790,651 A | 8/1998 | Suzuki | |
| 5,920,615 A | 7/1999 | Nolde | |
| 5,960,075 A | 9/1999 | Sutherland | |
| 5,970,488 A * | 10/1999 | Crowe et al. | 707/8 |
| 5,983,107 A | 11/1999 | Hayashi et al. | 455/446 |

(Continued)

FOREIGN PATENT DOCUMENTS

DE    100 64 107 A    6/2002

(Continued)

OTHER PUBLICATIONS

3rd Generation Partnership Project; *Technical Specification Group Services and System Aspects; Multimedia Broadcast/Multicast Service; Architecture and Functional Description (Release 6)* XP-002958426, pp. 16-45 (Jan. 2002).

(Continued)

*Primary Examiner*—Aung S Moe
*Assistant Examiner*—Feben Haile
(74) *Attorney, Agent, or Firm*—Ladas & Parry LLP

(57) ABSTRACT

The present invention discloses a method for managing multicast subscribers in mobile network, comprising: the data related with multicast traffic is classified into multicast-related record data and multicast route data, wherein said multicast-related record data is stored in the system for query, while said multicast route data is hierarchically stored in the system to determine how to forward multicast data; when a subscriber joins in a multicast group or the multicast subscriber exits the multicast group, said hierarchical multicast route data and said multicast-related record data are modified accordingly, when the multicast subscriber performs position register and position update in network, said hierarchical multicast route data in the system is modified accordingly; in said method, the management of multicast subscribers in mobile network can be achieved and both management efficiency and utilization coefficient of system resources are improved.

10 Claims, 4 Drawing Sheets

U.S. PATENT DOCUMENTS

| | | | |
|---|---|---|---|
| 5,991,270 | A | 11/1999 | Zwan |
| 6,118,766 | A | 9/2000 | Akers |
| 6,163,594 | A | 12/2000 | Kennedey |
| 6,185,191 | B1 | 2/2001 | Dipperstein |
| 6,212,168 | B1 | 4/2001 | So |
| 6,212,274 | B1 | 4/2001 | Ninh |
| 6,259,676 | B1 | 7/2001 | Kellock |
| 6,266,395 | B1 | 7/2001 | Liu |
| 6,415,022 | B1 | 7/2002 | Meeske |
| 7,046,639 | B2 * | 5/2006 | Garcia-Luna-Aceves et al. ............... 370/314 |
| 2001/0040956 | A1 | 11/2001 | King |
| 2002/0001288 | A1 | 1/2002 | Fukunaga |
| 2002/0003873 | A1 | 1/2002 | Rabenko et al. |
| 2002/0012327 | A1 | 1/2002 | Okada ............... 370/328 |
| 2002/0015489 | A1 | 2/2002 | Ben-David |
| 2005/0021833 | A1 * | 1/2005 | Hundscheid et al. ........ 709/236 |
| 2005/0054353 | A1 * | 3/2005 | Mademann ............... 455/458 |
| 2007/0280236 | A1 * | 12/2007 | Yang ............... 370/390 |

FOREIGN PATENT DOCUMENTS

| | | |
|---|---|---|
| EP | 0 822 728 A2 | 2/1998 |
| JP | 9-284829 | 10/1997 |
| JP | 10-117386 | 5/1998 |
| JP | 11-32370 | 2/1999 |
| JP | 2000-217157 A | 8/2000 |
| JP | 2001-177564 | 6/2001 |
| JP | 2001-513609 | 9/2001 |
| JP | 2002-44134 | 2/2002 |
| JP | 2002-51167 | 4/2002 |
| JP | 2002-321274 | 11/2002 |
| WO | 99/08457 | 2/1999 |
| WO | 99/52306 | 10/1999 |
| WO | 02/51187 A1 | 6/2002 |

OTHER PUBLICATIONS

Lee, J. and Cheng, M., "Hierarchical Level-based IP Multicasting for Tactical Networks", *Military Communications Conference Proceedings, IEEE*, pp. 15-19 (Oct. 1999).

Lee, S.J., et al., "A Performance Comparison Study of AD Hoc Wireless Multicast Protocols," INFOCOM 2000, *19TH Annual Joint Conference of the IEEE Computer and Communications Societies*, pp. 565-574 (Mar. 2000).

Stoica, I., et al., "Reunite: A Recursive Unicast Approach to Multicast," *INFOCOM 2000, 19th Annual Joint Conference of the IEEE Computer and Communications Societies*, pp. 1644-1653 (Mar. 2000).

Yang, C.S., et al., "An Efficient Multicast Delivery Scheme to Support Mobile I", *Database and Expert Systems Applications, Proceedings 10TH International Workshop, IEEE*, pp. 683-688 (Sep. 1999).

Lee, J., et al., "Hierarchical Level-based IP Multicasting for Tactial Networks", IEEE May 1999.

* cited by examiner

METHOD FOR MANAGING MULTICAST SUBSCRIBERS IN MOBILE NETWORK

BACKGROUND OF THE INVENTION

1. Field of the Invention

The present invention relates to a method for managing multicast subscribers in mobile network.

2. Background of the Invention

Multicast is a traffic widely used in Internet. With multicast traffic, data packets in the same route are only transmitted once according to the traffic content instead of being transmitted many times according to number of different subscribers, thus network resources are saved. Similarly, multicast traffic can also be used in mobile network to save network resources. Due to the mobility of subscribers in mobile network, multicast groups at network nodes vary dynamically, and only one-way connections exist between the system and subscribers. Therefore, the dynamic variation of multicast group members at current node is difficult to ascertain. Currently, the typical method to implement multicast in mobile network is to manage subscribers in multicast groups through querying for the data of the subscribers, i.e., determine the distribution of subscribers in multicast groups through querying for subscriber data stored in HLR (Home Position Register) of the mobile network, and then a forwarding path is set up separately for each subscriber. Dynamic distribution in the network for members in the groups is obtained by querying HLR, and in order to determine the forwarding paths, HLR should be queried whenever a multicast data packet is received. Such a method degrades the processing efficiency and may result in overload in the HLR. Furthermore, because each subscriber occupies a forwarding path exclusively, the multicast mode is a combination of unicast traffics basically inside the mobile network, which results in continuous establishment and release of wireless channels to implement multicast traffic with the method, thus conventional method for managing multicast subscribers in mobile network will impact and consume resources in mobile network greatly.

The key to overcome said problem is to determine the topological distribution of subscribers in network as well as forwarding paths. In an Internet environment, conventional method is to establish the topology of multicast subscriber groups in the network through transmitting query packets and receiving response messages periodically by the system. In mobile network, a similar method is also used, i.e., to establish a forwarding table for multicast subscribers through querying for current states of multicast subscriber groups at nodes periodically. Thus, if current positions and states of subscribers are determined through paging, occupancy of network resources and wireless resources will increase drastically with increase of subscribers in groups; if multicast paths are determined through querying in local databases at nodes of the network, query requests and occupancy for network resources in the entire network will increase drastically with the increase of nodes. Moreover, the processing efficiency will decrease with increase of subscriber groups due to more and more query requests to be processed at nodes; for mobile subscribers, the variation of subscriber distribution in current group is difficult to be obtained in real-time query method, and thus the forwarding paths for multicast data cannot be adjusted in time. At the same time, subscribers' movement makes the amount of subscribers at network nodes uncertain, and thus whether to use point-to-multipoint channel or point-to-point channel for the wireless interface is difficult to determine at the wireless interface side.

In conclusion, an effective solution to the application of multicast traffics in mobile network is still not available.

SUMMARY OF THE INVENTION

The object of the present invention is to provide a high-effective method for managing multicast subscribers in mobile network to improve the utilization coefficient of system resources.

To attain said object, the method for managing multicast subscribers in mobile network provided in present invention comprises:

(1) the data related with multicast traffic is classified into multicast-related record data and multicast route data, wherein said multicast-related record data is stored in the system for query, while said multicast route data is hierarchically stored in the system to determine how to forward the multicast data;

(2) when a subscriber joins in a multicast group or a multicast subscriber exits a multicast group, said hierarchical multicast route data and said multicast-related record data in said system are modified accordingly;

(3) when a multicast subscriber performs position register or position update in the network, said hierarchical multicast route data is updated accordingly.

Said method also comprises: topological structure of the mobile network is determined to enable nodes of the network to be a tree structure from superior layer to substrate when a multicast traffic is performed, i.e., each General Packet Radio Service (GPRS) Serving GPRS Support Node (SGSN) can correspond to one or more Radio Access Network (RANs), but each RAN corresponds to one SGSN.

In step (1), said multicast route data is classified to several tiers to store in the system, i.e., 2 tiers: data in tier 1 is stored in GGSN (Gateway GPRS Support Node) to record how the multicast data received forwards multicast data to SGSN; while data in tier 2 is stored in SGSN to record how the multicast data received forwards multicast data to subscriber cells and serve as reference to the forwarding mode for multicast data.

Said method of present invention also comprises:

GGSN multicast route tables are established at GGSN nodes to record how the multicast data received forwards multicast data to SGSN, and such a table comprises the following fields:

Group No., which is used to store multicast groups, which can be broadcast in GGSN;

Traffic Node, which is used to store destination SGSN, to which the multicast data can be broadcast in GGSN;

Update Flag, which is used to identify whether the record has been updated.

SGSN multicast route tables are established at SGSN nodes to record how the multicast data received forwards multicast data to subscriber cells and serve as reference to the forwarding mode for multicast data; said table comprises the following fields:

Group No., which is used to store multicast groups, which can be broadcast in SGSN;

Gateway Node: which is used to store the GGSN corresponding to the multicast group;

Cell: which is used to store destination cell, to which the multicast data can be broadcast in SGSN;

Amount of subscribers, which is an optional field and used to store the amount of subscribers of the multicast group in the destination cell;

Update Flag: which is used to identify whether the record is updated;

According to the method of the present invention, multicast data is classified to several tiers to store in the system to determine how the multicast data is forwarded and to determine the cells to which the multicast data is forwarded; when a subscriber joins in a multicast group or a multicast subscriber exits a multicast group, said hierarchical multicast route data and said multicast record data in system are modified accordingly. At the same time, when a multicast subscriber performs position register or position update in the network, said hierarchical multicast route data is updated accordingly, thus the present invention has the following advantages:

1. Because the multicast route data is updated accordingly when a multicast subscriber performs position register or position update, no extra wireless resources or network resources are occupied. Network resources and wireless resources are not consumed with the increase of nodes and groups, thus occupancy for network resources and wireless resources is less.

2. Whenever the multicast subscriber performs position update, the data in the multicast route table is updated in time. Hence the data in the multicast route table reflects the dynamic variation of multicast subscribers in the groups. Compared to the periodical query method, this method can further ensure that the multicast route table reflects the topological variation of multicast subscriber in the groups.

3. The forwarding mode for wireless resources can be determined directly because the multicast route table stores the amount of subscribers in each cell. Compared to the conventional method in which the amount of subscribers is estimated in each cell through pre-paging, this method will not result in severe consumption of wireless resources with the increase of subscribers.

4. This method stores multicast data hierarchically and provides update method, thus any failure or data at any node can be recovered automatically, and the reliability and security of the multicast route tables are improved. At the same time, the hierarchical management for the multicast route tables decreases complexity that individual nodes process and manages the route tables, and improves the processing efficiency and accuracy of the route tables.

5. Because other multicast-related data is not included in the multicast route tables, other multicast-related data is separated from the data in the multicast route tables to be processed, thus the processing efficiency at nodes is improved greatly without querying subscriber data when routes are forwarded. At the same time, severe waste of network resources in conventional method of query on share is avoided.

DETAILED DESCRIPTION OF THE EMBODIMENTS

The present invention is described in further detail according to the drawings and the following embodiments.

Figure 2:
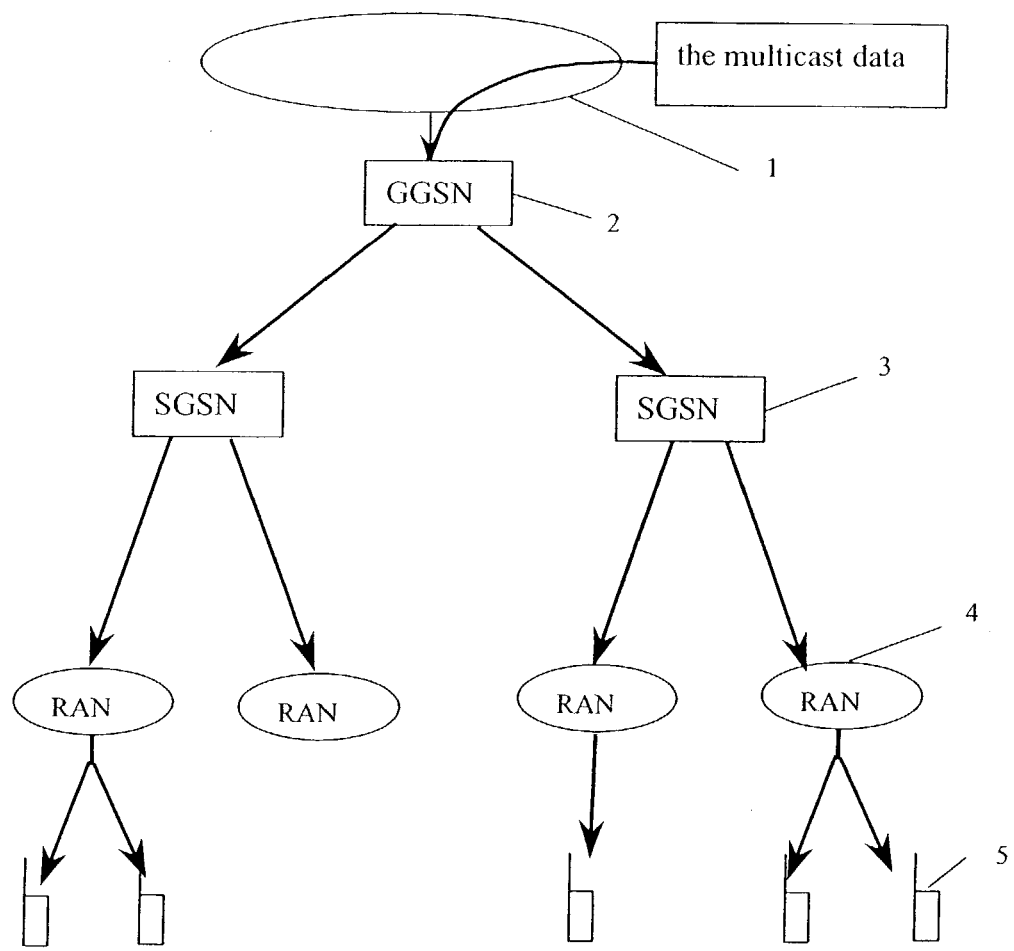
FIG. 2 is the network topology chart of the first type of mobile network in the present invention.
Figure 3:
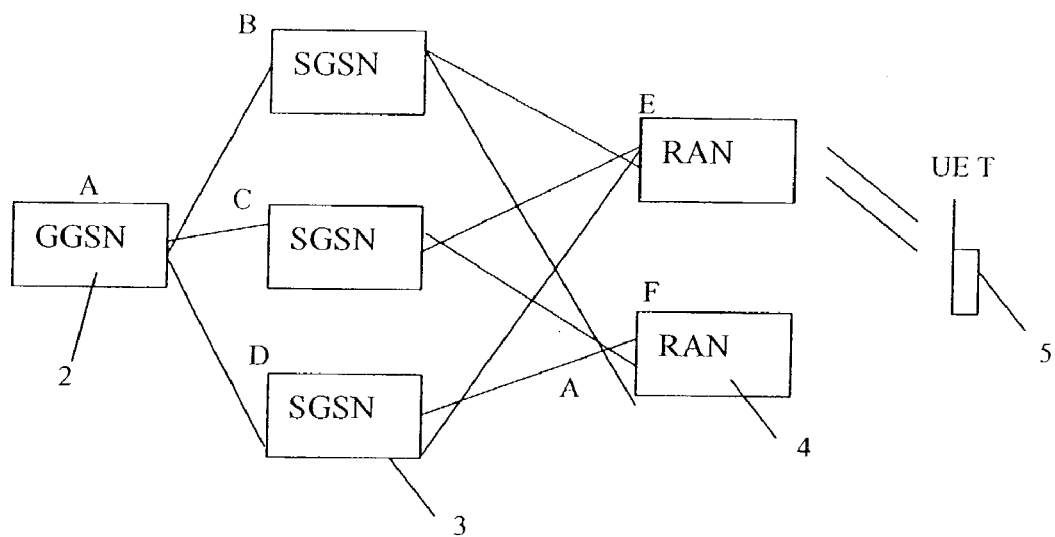
FIG. 3 is the network topology chart of the second type of mobile network in the present invention.

Referring to FIG. 2 and FIG. 3, wherein the network usually comprises a Gateway GPRS Support Node (GGSN) 2, Serving GPRS Support Node (SGSNs) 3, Radio Access Network (RANs) 4, and mobile stations 5.

The specific multicast subscriber groups can be always considered to connect with a specific GGSN group when viewed from the SGSN side. In actual cases, the GGSN 2 receives multicast data through an external network 1 and forwards the multicast data to SGSNs 3 in the mobile network, and then the SGSNs 3 sent the multicast data to the mobile stations 5 through the RANs 4. To avoid the SGSN receiving the same multicast data from several GGSNs and wasting network resources, some optimization strategies may be utilized to ensure that a SGSN is only associated with a specific GGSN for a specific multicast subscriber group, such a topological structure of mobile network is shown in FIG. 2. In FIG. 3, for the multicast data, in practice, the same set of multicast data may come from different SGSNs due to the many-many relation between SGSNs and RANs, thus a RAN may receive the same data from different nodes. If said method is used to manage multicast data and routes without any simplification of network topological structure, it will result in waste of system resources and chaos of management. Thus the logical relationship among nodes in FIG. 3 should be simplified to make the relation between SGSNs and RANs be point-to-multipoint relationship as shown in FIG. 2. Through determining the topological structure of a mobile network, nodes in the network forms a superior-to-substrate tree structure, i.e., each SGSN in the network can corresponds to one or more RANs, while each RAN corresponds to only one SGSN. Take FIG. 3 as an example, meshy topological structure is needed to change to be tree topological structure.

Figure 1:
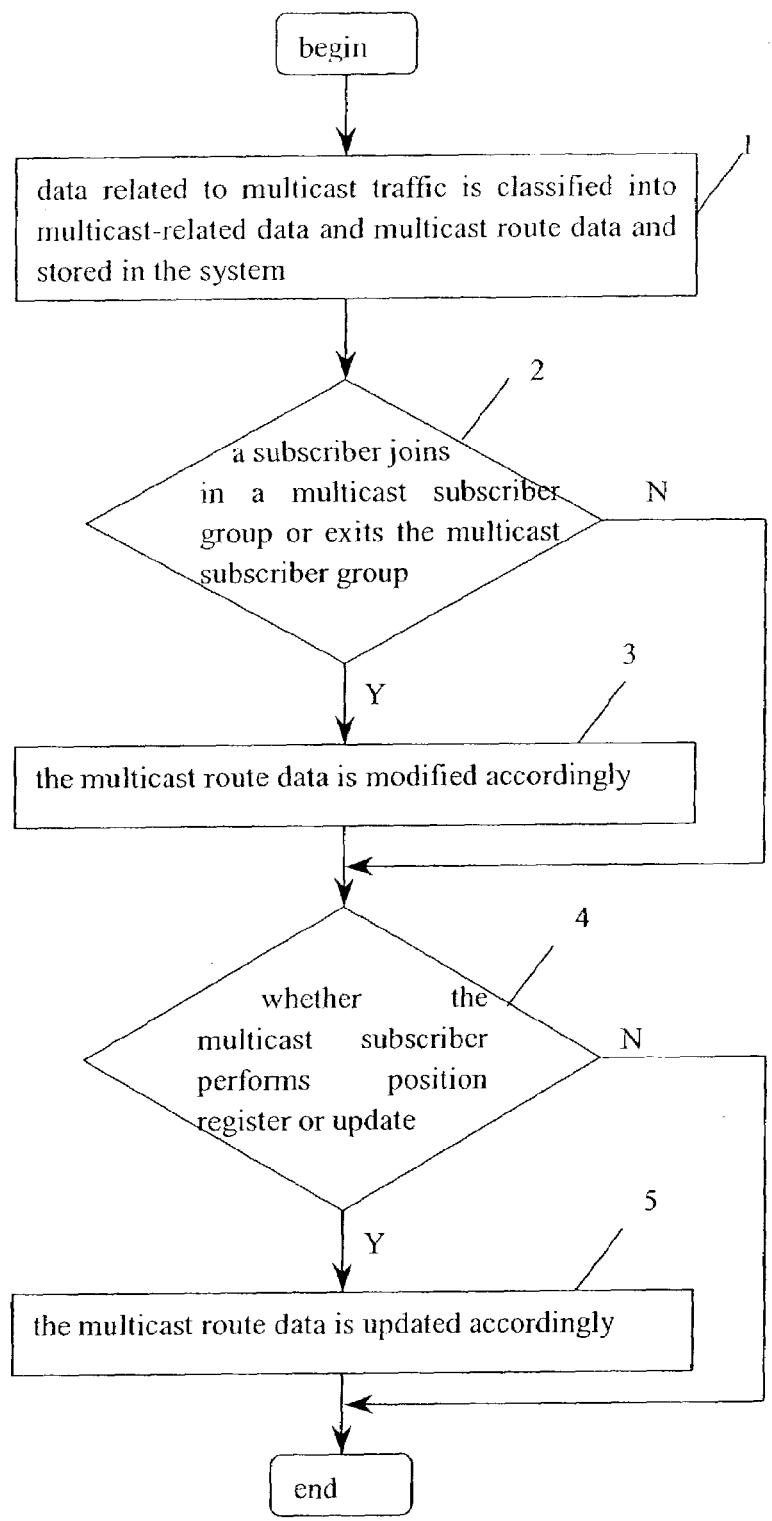
FIG. 1 is the flowchart of the embodiment of the present invention.

For instance, for common point-to-point data transmission, the data of a RAN subscriber registered at node E can be transmitted via the SGSN at node B, SGSN at node C, and SGSN at node D usually according to original node where the subscriber registered. For multicast data transmission, the data of a RAN subscriber registered at node E can only be transmitted via the SGSN at node B. In this way, each RAN can be associated with only one SGSN, thus the network topology in FIG. 3 is transformed into a tree topological structure, as shown in FIG. 1. Thus, A RAN subscriber registered at node E may correspond to 2 nodes: SGSN at node C and SGSN at node B, wherein the former is used to process normal traffics and can be called as a 'Register SGSN', and the latter is used to process multicast traffics and can be called as a 'multicast SGSN'.

FIG. 1 is the flowchart of an embodiment of the present invention. According to FIG. 1, the data related with multicast traffic is classified into 2 types: multicast-related record data and multicast route data. Said multicast-related record data stores the information related to subscribers joined in a multicast subscriber group and is used to query for multicast traffic instead of forwarding multicast data, thus distribution of subscribers in a multicast subscriber group can be determined. The data is stored in both HLRs and SGSNs to avoid the repeated query in HLRs and overload for HLR. Said multicast route data is used to determine how the nodes forward data at the topological structure of network. The multicast route data is used to determine the forwarding path of data, and hierarchical store method is used in the present invention. The basic ideal in managing multicast route data is to utilize the features of mobile network, i.e., positions of subscribers needing register and subscribers' positions needing update when the subscribers' positions vary, to maintain and update the multicast route data. The multicast route data is only related to the topological distribution of subscribers in groups in network, and it has no business with the actual information of each subscriber.

The multicast-related record data and multicast route data supplement each other, which can determine not only the topological distribution of subscriber groups at nodes of network, but also not only distribution of subscribers at nodes of network, thus the high efficiency and effectiveness of multicast data forwarding can be guaranteed. Due to the simple management of multicast-related record data, the present invention mainly relates to the management of multicast route data.

In detail, in order to manage multicast route data better, the multicast route data is classified into 2 tiers: data in tier 1 is stored in GGSN (Gateway GPRS Support Node) to record how the multicast data received forwards multicast data to SGSN; while data in tier 2 is stored in SGSN to record how the multicast data received forwards multicast data to subscriber cells. The multicast route data stored in SGSNs may also include the amount of subscribers in each cell to determine whether a point-to-multipoint channel or a point-to-point channel is used for the air interface in forwarding multicast messages to the cell according to the amount of subscribers.

Therefore, GGSN multicast route tables should be established at GGSN nodes to record how the multicast data received forwards multicast data to SGSN; said table comprises the following fields:

Group No., which is used to store multicast groups, which can be broadcast in GGSN;

Traffic Node, which is used to store destination SGSN, to which the multicast data can be broadcast in GGSN;

Update Flag, which is used to identify whether the record has been updated.

SGSN multicast route tables are established at SGSN nodes to record how the multicast data received forwards multicast data to subscriber cells, said table comprises the following fields:

Group No., which is used to store multicast groups, which can be broadcast in SGSN;

Gateway Node: which is used to store the GGSN corresponding to the multicast group;

Cell: which is used to store destination cell, to which the multicast data can be broadcast in SGSN;

Amount of subscribers, which is used to store the amount of subscribers of the multicast group in the destination cell;

Update Flag: which is used to identify whether the record is updated.

For example, two subscribers joined in subscriber group 100 are in SGSN1 and SGSN2 respectively and the subscriber group 100 corresponds to GGSN1 according to the optimization strategy, the following GGSN multicast route table should be established at GGSN1:

| Group No. | Traffic Node | Update Flag |
|-----------|--------------|-------------|
| 100       | SGSN1        | Y           |
|           | SGSN2        | Y           |
| ...       | ...          |             |

The following SGSN multicast route table should be established at SGSN1:

| Group No. | GGSN  | Cell | Amount of Subscribers | Update Flag |
|-----------|-------|------|-----------------------|-------------|
| 100       | GGSN1 | C1   | 12                    | Y           |
|           |       | C2   | 11                    | Y           |
| ...       |       |      | ...                   |             |

For the received multicast data with 'Group No. 100', GGSN1 queries in its own GGSN multicast route table to determine that subscribers with 'Group No. 100' are distributed at SGSN1 and SGSN2. Then GGSN1 forward the multicast data to SGSN1 and SGSN2. Wherein when receiving multicast data with 'Group No. 100', SGSN1 queries in its own multicast route table to determine to forward the multicast data to C1 and C2. At the same time, SGSN1 will determine the forwarding mode of multicast data for the air interface according to the amount of subscribers in the cells. If a SGSN finds that there are more subscribers in a cell, it will inform the RAN of a group number to identify and allocate a point-to-multipoint channel; if finding that there are fewer subscribers in the cell, the SGSN will search for the subscribers in the cell and allocate a point-to-point channel for each subscriber. As the result, the subscribers distributed in C1 and C2 can receive the multicast data.

It should be noted that a SGSN multicast route table may not include the 'Amount of subscribers' field to simplify the complexity of managing data in the multicast route table. In this case, for the SGSN is, the forwarding mode of multicast data for the wireless interface is merely unable to determine, and the forwarding of multicast data at network side will not be affected. The SGSN forwards the multicast data to relevant cells, and then the cells themselves determine the forwarding mode of multicast data for the air interface.

In step (2), the SGSN determines whether some subscriber joins in a multicast subscriber group or a multicast exits a multicast subscriber group. If yes, hierarchical multicast route data will be modified accordingly in step (3). That is to say, during the process of establishing said route table, a SGSN first determines whether a route item related with the subscriber exists, if it not, the item should be added in the route table and at the same time the SGSN determines whether to inform the GGSN of modifying the multicast route table; if yes, the SGSN will add an 'Updated' flag. If the SGSN route table requires calculating the amount of subscribers in each cell, the data item of 'Amount of Subscribers' in the SGSN multicast route table should be modified. In this way, multicast route tables can be established and maintained at SGSNs and GGSNs in turn.

When a multicast subscriber exits a multicast subscriber group, it is no need to modify the SGSN multicast route table and GGSN multicast route table if the SGSN multicast route table doesn't include the 'Amount of Subscribers', and only the multicast-related record data at SGSNs is modified and the HLR is informed of modifying multicast-related record data of the subscribers. Possible modification of data in the multicast route table can be done in subsequent position register. If the SGSN multicast route table includes an 'Amount of Subscribers' field, besides said operation the SGSN should determine whether to delete relevant items and inform the GGSN of updating the GGSN multicast route table according to the updated 'Amount of Subscribers' in the SGSN multicast route table.

If the subscriber detaches and the subscriber is a member of a subscriber group, it can be processed in a method similarly to the mode of 'user exit'.

Thus, when receiving multicast data group from an external network, the GGSN queries in the GGSN multicast route table (tier 1) and then forwards the multicast data to corresponding SGSN. After receiving the multicast data, relevant SGSN queries in the SGSN multicast route table (tier 2) to determine the distribution of corresponding subscriber groups, and forward the multicast data to corresponding cells, thus the multicast data is forwarded. If said SGSN multicast route table includes the record of 'Amount of Subscribers' of each cell, said SGSN can also determine the forwarding mode of multicast data for the wireless interface. If there are more subscribers in the cell, the SGSN will inform the RAN of establishing a point-to-multipoint channel with relevant group ID; if there are fewer subscribers in the cell, the SGSN will inform the RAN of establishing point-to-point channels with Subscriber ID.

Figure 4:
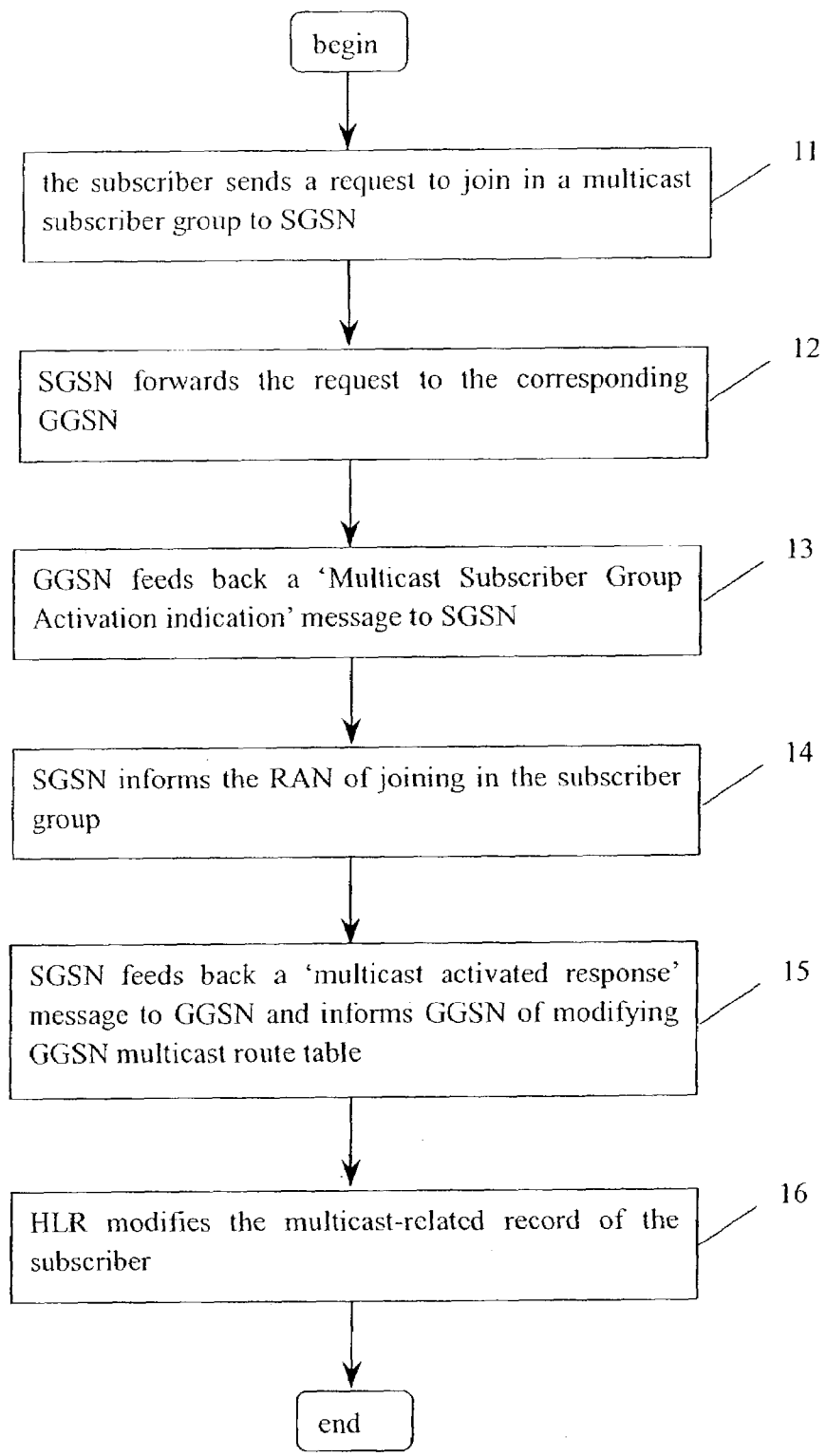
FIG. 4 is the flowchart of the process in which a multicast subscriber joins in a multicast subscriber group.

In this step, the process through which a subscriber joins in a subscriber group comprises the following steps, referring to FIG. 4:

First, in step 11, a subscriber sends a request to a multicast subscriber group comprising the Group No. to which the subscriber will join in; then turn to step 12, the SGSN parses out the only corresponding GGSN according to the Group No. and the optimization strategy, and forwards the subscriber's request to the GGSN; in step 13, the GGSN implements corresponding operation according to the subscriber's request to determine whether the subscriber is allowed to join in the multicast subscriber group, if the GGSN determines to allow the subscriber to join in the multicast subscriber group through implementing corresponding operation, e.g., querying subscriber multicast record in HLR to determine whether the subscriber has relevant authority, and a 'Multicast Subscriber Group Activation indication' is feedback to the SGSN; in step 14, after receiving the 'Multicast Subscriber Group Activation indication', the SGSN instructs the RAN to implement operations (e.g., forwarding multicast parameters) to add the subscriber in the subscriber group, and returns the result to SGSN. The SGSN modifies corresponding multicast-related record data and SGSN multicast route table according to the current position of the subscriber to reflect that the subscriber has joined in the subscriber group as well as the topological distribution of the subscribers in the subscriber group in the SGSN area; in step 15, SGSN feedbacks the 'multicast activated response' message to GGSN, GGSN modifies the GGSN multicast route table according to the message; in step 16, SGSN informs HLR of the message that the subscriber has joined in the subscriber group, HLR modifies the multicast-related record data of the subscriber to reflect the fact that the subscriber has joined in the subscriber group.

In step 2, when being determined that no subscriber joins in the subscriber group or a multicast subscriber exits the group, turn to step 4.

In step 4, the system determines whether the multicast subscribers are performing position register and position update, if yes, the hierarchical multicast route data of the system is updated accordingly in step 5; otherwise end the process.

As the state of each subscriber in the network varies dynamically, for example, the computer of the subscriber is shut down abnormally, severe waste of network resources may occur if the multicast route data doesn't reflect the variation of subscriber's state in time due to no normal message exchange between the subscriber and the network. Hence the multicast route tables in the system should reflect the dynamic variation of subscribers in subscriber groups at nodes and should update automatically.

In step 5, the update of hierarchical multicast route data can be achieved during position register of subscribers' terminal. Usually, if the network node receives a position register message from the terminal, it determines that the terminal is still in the managed range of the node and determines that whether the current position of the subscriber is recorded correctly. If the network detects that the terminal didn't register its position for several time circles, it will deem that the subscriber is detached due to some reasons.

Because that the multicast-related record data of the subscriber has been added to the SGSN and HLR when the subscriber joined in the subscriber group, the SGSN can obtain the subscriber group which the subscriber joined in through querying in the local database according to the subscriber's ID each time the subscriber registers his/her position. Subsequently, the SGSN updates the SGSN multicast route table according to the subscriber group, which the subscriber joined in. The steps are described as following:

(21) If the SGSN multicast route table has no item corresponding to the subscriber, it possibly means data inconsistency resulted from SGSN failures or other factors because that the subscriber is attached to the subscriber group for the first time. Thus the item should be added in, and the SGSN should determine whether to inform the GGSN of updating relevant GGSN multicast route table. If the SGSN detects that no route information related to the multicast subscriber group is available, it should send an update message to the GGSN;

(22) If the SGSN multicast route table includes the 'Amount of Subscribers', the SGSN may be activated by the position register to calculate the amount of subscribers in cells at the node for a certain time, and then it can correct the SGSN multicast route table according to the calculation result to reflect the exact amount of subscribers in cells at that time exactly.

(23) If relevant item is not updated for an enough long time, it indicates that the subscriber is not able to be accessible due to some reasons or there is some inconsistency. In this case, the SGSN will delete the item from the SGSN route table and determine whether to inform the GGSN of updating relevant multicast route table. If yes, the SGSN will send an update message.

In addition, in order to avoid any inconsistency between the GGSN route table and the SGSN route table, the SGSN submits 'Subscriber Group Exist' messages to relevant GGSNs periodically or when it detects a GGSN restarts according to the multicast route group information stored in it. If the GGSN doesn't receive the message for a certain time, it may deem that the relevant route item is invalid and can be deleted. If the GGSN receives the message and finds it new to the existing data, it will deem that update data at the GGSN needs to be updated to reflect the current topological distribution of subscriber groups and avoid inconsistency between different multicast data tables.

The update of hierarchical multicast route data described in step 5 can also be performed when the position of a subscriber's terminal is updated. For example, suppose the SGSN forwards multicast data to a cell at a specific second, but all subscribers in the cell moves out of the cell at the next second, the SGSN should not forward multicast data to the cell. Hence the multicast route tables should reflect the dynamic variation of subscribers' positions.

When multicast subscribers' positions vary, the update of multicast route data may be performed through the following steps:

(31) determine whether the position update of multicast subscriber is one inside SGSN. If yes, the SGSN updates the SGSN multicast route table only according to the multicast-related record data and the position information submitted by the subscriber. If the 'Amount of Subscribers' needs calculating in the SGSN multicast route table, the SGSN will update corresponding subscriber's item according to the updated position of the subscriber.

(32) If the position of the subscriber moves to another SGSN, the terminal will submit the original International Mobile Station Identifier (IMSI) to the original SGSN ID, the new SGSN will retrieve all data of the subscriber from the original SGSN, wherein the data includes all multicast-related record data of the subscriber; at the same time, the original SGSN updates the multicast route table, and it will determine whether to delete relevant items from the multicast route table and inform the original GGSN of updating GGSN multicast route table according to the updated amount of subscribers if the original SGSN multicast route table includes the 'Amount of Subscribers'; the new SGSN will determine whether to update its own SGSN multicast route table according to the current subscriber group in which the subscriber joined, the current cell where the subscriber is, and the information that whether current subscriber group supports roaming. If the subscriber group in which the subscriber joined supports roaming, the new SGSN will update corresponding GGSN multicast route table besides the SGSN multicast route table according to the current state of the SGSN multicast route table, said process comprises the following steps:

(41) if the subscriber is in 'idle' state, the new SGSN will choose a GGSN according to the current optimization strategy and then determine whether the item exists in its own SGSN multicast route table as well as whether to inform the chosen GGSN of updating the corresponding GGSN multicast route table;

(42) if the subscriber is in 'connection' state and the subscriber group in which the subscriber joined doesn't need to support continuous data transmission, the new SGSN will choose a GGSN according to the current optimization strategy and then determines whether the item exists in its own SGSN multicast route table as well as whether to inform the chosen GGSN of updating the corresponding GGSN multicast route table;

(43) if the subscriber is in 'connection' state and the subscriber group in which the subscriber joined should support continuous data transmission, the new SGSN will determine whether to need to inform the original GGSN of updating GGSN multicast route table to add the item. If yes, a temporary data channel between the original GGSN and the new SGSN is established to support continuous transmission of multicast data. When the multicast data is transmitted over, the new SGSN will inform the original GGSN of deleting the temporary item and then choose a GGSN according to the current optimization strategy; then the SGSN determines whether the corresponding item exists in its own SGSN multicast route table as well as whether to inform the chosen GGSN of updating the corresponding GGSN multicast route table.

Through said steps, said hierarchical multicast route table can be adjusted automatically to ensure the consistency between the content of the multicast route tables and the current topological distribution of multicast subscribers in the subscriber groups, thus any inconsistency and resources waste when forwarding multicast data are avoided due to abnormalities.

At last, it is noted:

1. The position register of subscribers' terminals in present invention comprises initial attachment and periodical positions register.

2. The method described in the present invention can also be used for managing multicast subscribers in Circuit Switched (CS) due to the similarity between the structures of Circuit-Switched (CS) and Packet-Switched (PS).

What is claimed is:

1. A method for managing multicast subscribers in a network, comprising:
   (1) data related with multicast service being classified into multicast-related record data and multicast route data, said multicast-related record data being stored in the network for query, while said multicast route data being hierarchically stored in the network to determine how to forward multicast data depending on topological distribution of multicast group subscribers in the network;
   (2) when a subscriber joins in a multicast group or a multicast subscriber exits a multicast group, said hierarchically-stored multicast route data and said multicast-related record data in said network being modified accordingly;
   (3) when the multicast subscriber performs position update in the network, said hierarchically-stored multicast route data being updated accordingly; wherein in step (1), said multicast route data is classified into 2 tiers to be stored in the network, wherein, data in tier 1 is stored in a GGSN (Gateway General Packet Radio Service (GPRS) Support Node) to record how to forward received multicast data to a SGSN (Serving General Packet Radio Service (GPRS) Support Node); while data in tier 2 is stored in the SGSN to record how to forward received multicast data to subscriber cells; wherein a subscriber joining in a multicast group in step (2) comprising the following steps:
   (A1) the subscriber sending a request to the SGSN comprising a number of a Group which the subscriber will join in;
   (A2) the SGSN parsing out an only corresponding GGSN according to the Group No. and an optimization strategy, and forwarding the subscriber's request to the GGSN;
   (A3) the GGSN implementing corresponding operation according to the subscriber's request to determine whether the subscriber is allowed to join in the multicast subscriber group, and if yes, returning a 'Multicast Subscriber Group Activation indication' to the SGSN;
   (A4) after receiving the 'Multicast Subscriber Group Activation indication', the SGSN instructing a Radio Access Network (RAN) to implement operations to add the subscriber into the multicast group, the RAN returning a result to the SGSN after adding the subscriber into the multicast group, the SGSN modifying corresponding SGSN multicast-related record data and a SGSN multicast route table comprising the data in tier 2 according to a current position of the subscriber to reflect that the subscriber has joined in the multicast group and reflect a topological distribution of subscribers in the multicast group in the network;
   (A5) the SGSN feeding-back a multicast activated response message to the GGSN, and the GGSN modifying a GGSN multicast route table comprising the data in tier 1 according to the message;
   (A6) the SGSN informing a Home Position Register (HLR) that the subscriber has joined in the multicast subscriber group, and the HLR modifying the multicast-related record data of the subscriber to reflect the fact that the subscriber has joined in the multicast group.

2. A method for managing multicast subscribers of claim 1, further comprising: topological structure of the mobile network being determined to enable nodes of the network to be a tree structure from superior layer to substrate when a multicast traffic is performed, wherein, each SGSN corresponds to one or more RANs, but each RAN corresponds to one SGSN.

3. A method for managing multicast subscribers of claim 1, wherein the GGSN multicast route table comprising the data in tire 1 is established at the GGSN node in the network to record how to forward received multicast data to the SGSN in the network, and the table comprises the following fields:
   Group No., used to store a multicast group that can be broadcast by the GGSN;
   Traffic Node, used to store a destination SGSN, to which the multicast data can be broadcast by the GGSN;
   Update Flag, used to identify whether a record has been updated.

4. A method for managing multicast subscribers of claim 1, wherein the SGSN multicast route table comprising the data in tier 2 is established at the SGSN node in the network to record how to forward received multicast data to a subscriber cell in the network, wherein, said table comprises the following fields:
   Group No., used to store a multicast group that can be broadcast by the SGSN;
   Gateway Node, used to store the GGSN corresponding to the multicast group;
   Cell, used to store a destination cell, to which the multicast data is broadcast by the SGSN;
   Update Flag, which is used to identify whether a record is updated.

5. A method for managing multicast subscribers of claim 1, wherein said method further comprising:
   (E1) the SGSN submitting a 'Subscriber Group Exist' message to relevant GGSN periodically or when detecting restart of the GGSN according to the multicast group numbers stored in the SGSN multicast route table and corresponding GGSN identifiers parsed by group numbers;
   (E2) if the multicast route table at GGSN doesn't receive the message for a long enough time, relevant item being deemed to be invalid and being deleted;
   (E3) if the multicast route table at GGSN receives the 'Subscriber Group Exist' message submitted by SGSN, but the item is not in GGSN, GGSN data being deemed to be wrong, and being added.

6. A method for managing multicast subscribers-in a network, comprising:
   (1) data related with multicast service being classified into multicast-related record data and multicast route data, said multicast-related record data being stored in the network for query, while said multicast route data being hierarchically stored in the network to determine how to forward multicast data depending on topological distribution of multicast group subscribers in the network;
   (2) when a subscriber joins in a multicast group or a multicast subscriber exits a multicast group, said hierarchically-stored multicast route data and said multicast-related record data in said network being modified accordingly;
   (3) when the multicast subscriber performs position update in the network, said hierarchically-stored multicast route data being updated accordingly; wherein in step (1), said multicast route data is classified into 2 tiers to be stored in the network, wherein, data in tier 1 is stored in a GGSN (Gateway General Packet Radio Service (GPRS) Support Node) to record how to forward received multicast data to a SGSN (Serving General Packet Radio Service (GPRS) Support Node); while data in tier 2 is stored in the SGSN to record how to forward received multicast data to subscriber cells; wherein when a multicast subscriber performs position register in the network, said hierarchically-stored multicast route data being updated accordingly, and said hierarchically-stored multicast route data being updated comprises the following steps:
   (B1) when the multicast subscriber performs position register, the SGSN searching for the multicast-related record data of the subscriber to determine whether the subscriber has joined in a corresponding multicast group, and if yes, the SGSN searching in a SGSN multicast route table comprising the data in tier 2 according to a group No. of the multicast group in which the subscriber has joined and the current position of said subscriber, if the SGSN multicast route table has no item corresponding to said subscriber group No. and the subscriber's cell, the item being added in, and determining whether to inform the GGSN to update relevant GGSN multicast route table comprising the data in tier 2, and if yes, sending a update notification to the GGSN; if said item has already existed, the SGSN adding an 'Updated' flag to said item;
   (B2) if an 'Amount of Subscribers' is need to be calculated in the SGSN multicast route table, the SGSN calculating the amount of subscribers in cells at the node, and then correcting the SGSN multicast route table according to the calculation result to reflect the exact amount of subscribers in the cells at that time;
   (B3) if a relevant item is not updated for a long enough time, the SGSN deleting the item from the SGSN multicast route table and determining whether to inform the GGSN to update relevant multicast route table, if yes, the SGSN sending an update message.

7. A method for managing multicast subscribers of claim 6, wherein said method further comprising:
   (E1) the SGSN submitting a 'Subscriber Group Exist' message to relevant GGSN periodically or when detecting restart of the GGSN according to the multicast group numbers stored in the SGSN multicast route table and corresponding GGSN identifier parsed by group numbers;
   (E2) if the multicast route table at GGSN doesn't receive the message for a long enough time, relevant item being deemed to be invalid and being deleted;
   (E3) if the multicast route table at GGSN receives the 'Subscriber Group Exist' message submitted by SGSN, but the item is not in GGSN, GGSN data being deemed to be wrong, and being added.

8. A method for managing multicast subscribers in a network, comprising:
   (1) data related with multicast service being classified into multicast-related record data and multicast route data, said multicast-related record data being stored in the network for query, while said multicast route data being hierarchically stored in the network to determine how to forward multicast data depending on topological distribution of multicast group subscribers in the network;

(2) when a subscriber joins in a multicast group or a multicast subscriber exits a multicast group, said hierarchically-stored multicast route data and said multicast-related record data in said network being modified accordingly;

(3) when the multicast subscriber performs position update in the network, said hierarchically-stored multicast route data being updated accordingly; wherein in step (1), said multicast route data is classified into 2 tiers to be stored in the network, wherein, data in tier 1 is stored in a GGSN (Gateway General Packet Radio Service (GPRS) Support Node) to record how to forward received multicast data to a SGSN (Serving General Packet Radio Service (GPRS) Support Node); while data in tier 2 is stored in the SGSN to record how to forward received multicast data to subscriber cells; wherein the hierarchically-stored multicast route data is updated when a multicast subscriber performs position update in step (3) comprises the following steps:

(C1) determining whether the position update of the multicast subscriber is one inside the SGSN, if yes, the SGSN searching in a SGSN multicast route table comprising the data in tier 2 for relevant record of the subscriber only according to a subscriber ID and the position information submitted by the subscriber, and obtaining a number of group which the subscriber has joined in, then updating the SGSN multicast route table according to the group number and the position information;

(C2) if the subscriber moves to another SGSN, the subscriber submitting an original International Mobile Station Identifier (IMSI) and the original SGSN ID to a new SGSN, the new SGSN retrieving all data of the subscriber from the original SGSN; at the same time, the original SGSN updating the multicast route table, and determining whether to delete relevant items from the multicast route table and inform the original GGSN to update a GGSN multicast route table according to the updated amount of subscribers if the original SGSN multicast route table includes an item 'Amount of Subscribers'; the new SGSN determining whether to update the SGSN multicast route table according to a current subscriber group in which the subscriber joined a current cell where the subscriber is in, and an information that whether the current subscriber group supports roaming, if the subscriber group in which the subscriber has joined supports roaming, the new SGSN determining whether to update corresponding GGSN multicast route table according to a current state of the SGSN multicast route table.

9. A method for managing multicast subscribers of claim 8, wherein if the subscriber group in which the subscriber joined supports roaming, the new SGSN determining whether to update corresponding GGSN multicast route table according to the current state of the SGSN multicast route table described in step (C2), comprising the following steps:

(D1) if the subscriber is in 'idle' state, the new SGSN choosing the GGSN according to a current optimization strategy and then determining whether to need to update the SGSN multicast route table, if yes, updating it; at the same time informing the chosen GGSN to update the corresponding GGSN multicast route table, and if necessary, sending an information;

(D2) if the subscriber is in 'connection' state and the subscriber group in which the subscriber joined does not need to support continuous data transmission, the new SGSN choosing the GGSN according to a current optimization strategy and then determining whether to need to update the SGSN multicast route table, if yes, determining whether to need to inform the chosen GGSN to update the corresponding GGSN multicast route table, if yes, sending an information;

(D3) if the subscriber is in 'connection' state and the subscriber group in which the subscriber joined supporting continuous data transmission, the new SGSN determining whether to need to inform the original GGSN to update the GGSN multicast route table to add the item, if yes, a temporary data channel between the original GGSN and the new SGSN being established to support continuous transmission of multicast data, when the multicast data transmission is finished, the new SGSN informing the original GGSN to delete the temporary item and then choosing the GGSN according to a current optimization strategy; then determining whether to need to update the SGSN multicast route table, if yes, determining whether to need to inform the chosen GGSN to update the corresponding GGSN multicast route table, if yes, sending an information.

10. A method for managing multicast subscribers of claim 8, wherein said method further comprising:

(E1) the SGSN submitting a 'Subscriber Group Exist' message to relevant GGSN periodically or when detecting restart of the GGSN according to the multicast group numbers stored in the SGSN multicast route table and corresponding GGSN identifier parsed by group numbers;

(E2) if the multicast route table at GGSN doesn't receive the message for a long enough time, relevant item being deemed to be invalid and being deleted;

(E3) if the multicast route table at GGSN receives the 'Subscriber Group Exist' message submitted by SGSN, but the item is not in GGSN, GGSN data being deemed to be wrong, and being added.

* * * * *